UNITED STATES PATENT OFFICE.

BYRON E. ELDRED, OF NEW YORK, N. Y., ASSIGNOR TO CHEMICAL DEVELOPMENT COMPANY, A CORPORATION OF MAINE.

CELLULOSE-ESTER COMPOSITION.

1,408,423. Specification of Letters Patent. Patented Feb. 28, 1922.

No Drawing. Application filed February 14, 1918. Serial No. 217,142.

*To all whom it may concern:*

Be it known that I, BYRON E. ELDRED, a citizen of the United States, residing at New York city, county of Queens, and State of New York, have invented certain new and useful Improvements in Cellulose-Ester Compositions, fully described and represented in the following specification.

It is known to dissolve such cellulose esters as nitrocellulose and acetyl cellulose in either liquid solvents, such as methyl alcohol, or solid solvents, such as camphor. One or more of the components of such a solvent may be by itself a non-solvent; ethyl alcohol, when used alone, being an example of such a non-solvent, although when camphor is dissolved in it a good solvent mixture is formed.

The compositions formed by such solutions of the cellulose esters are adapted for various uses, but certain of them are particularly intended for use in the manufacture of films for photographic purposes. In devising my new composition I have had this special use more particularly in mind, as it is especially adapted for such purpose, although it is also available for other uses, such as imitations of natural substances, sheets, varnishes, etc.

I have discovered that the olefin chlorhydrins form excellent solvents for cellulose esters; specifically, ethylene chlorhydrins, $C_2H_4ClOH$, propylene chlorhydrin, $C_3H_6ClOH$, and butylene chlorhydrin $C_4H_8ClOH$. These olefin chlorhydrins are all soluble in water, which property distinctly differentiates them from otherwise similar substances whose use has heretofore been proposed.

As illustrative of one preferred way of making my improved composition I dissolve 10 parts by weight of acetyl cellulose in 100 parts by weight of propylene chlorhydrin. Stirring or agitation expedites the operation. When the acetyl cellulose has been completely dissolved, the composition is ready for use without admixture with other solvents. Where it is intended to manufacture films or other solid objects, the solutions are allowed to evaporate. Other solvents or non-solvents, such as ethyl alcohol, acetone and ethyl acetate, may be added, if desired.

I am aware that it has been proposed to dissolve either nitrocellulose or acetyl cellulose in so-called ethylene chlorhydrin to form a composition intended for use in the manner contemplated by me; but the properties ascribed to the supposed ethylene chlorhydrin conclusively show that the substance employed was something other than ethylene chlorhydrin. Recent thorough investigations of the properties of ethylene chlorhydrin, conducted by myself and others associated with me, show that it is most readily soluble in water and in all proportions, and it is therefore highly probable that the compound heretofore proposed to be used was a dichlorid or possibly a chlorhydrin of one of the higher olefins.

Propylene chlorhydrin also is soluble in water to the extent of about twenty-four per cent by weight.

Of the several olefin chlorhydrins, the use of propylene chlorhydrin is preferred. Propylene is the most readily available of the olefins in that it is most easily separated and is the most readily converted into chlorhydrin. Inasmuch as propylene chlorhydrin forms a saturated solution with water, when present, to the extent, as above stated, of about twenty-four per cent, it is more easily produced from a water solution than ethylene chlorhydrin, which, as above stated, is soluble in water in all proportions. The solvent power of propylene chlorhydrin is so great that solutions of acetyl cellulose can be made over a wide range of concentrations from one per cent up to stiff jellies or plastic compositions. The solvent action is so rapid that the effect of the solvent may be observed almost at the instance of contact therewith of the acetyl cellulose. I find, also, that propylene chlorhydrin saturated with water is an excellent solvent.

By reason of the peculiar properties and advantages of propylene chlorhydrin I have claimed a composition containing propylene chlorhydrin in a separate and more specific claim.

To prepare either propylene chlorhydrin or ethylene chlorhydrin, having the characteristics herein ascribed to it, I preferably proceed in accordance with the process described in my application Serial No. 178,364, filed July 3, 1917, or in accordance with the process described in my application Serial No. 212,429, filed January 18, 1918.

Having now fully described my invention, what I claim and desire to protect by Letters Patent is:

1. A new composition of matter consisting of a solution of a cellulose ester in a water soluble olefin chlorhydrin containing water.

2. A new composition of matter consisting of a solution of a cellulose ester in propylene chlorhydrin.

In testimony whereof, I have hereunto set my hand.

BYRON E. ELDRED.